United States Patent [19]

Onal

[11] Patent Number: 4,572,904
[45] Date of Patent: Feb. 25, 1986

[54] LEAD-TOLERANT CATALYST SYSTEM FOR TREATING EXHAUST GAS CONTAINING LEAD COMPOUNDS

[75] Inventor: Isik Onal, Arlington Heights, Ill.

[73] Assignee: Signal Applied Technologies Inc., La Jolla, Calif.

[21] Appl. No.: 662,733

[22] Filed: Oct. 19, 1984

Related U.S. Application Data

[63] Continuation-in-part of Ser. No. 536,416, Sep. 27, 1983, abandoned.

[51] Int. Cl.$^4$ ............... B01J 21/04; B01J 23/42; B01J 23/44; B01J 23/46
[52] U.S. Cl. ............... 502/333; 502/325; 502/332; 502/334; 502/339; 423/213.5
[58] Field of Search ............... 502/325, 332, 333, 334, 502/339; 423/213.5

[56] References Cited

U.S. PATENT DOCUMENTS

| | | | |
|---|---|---|---|
| 3,304,150 | 2/1967 | Stover et al. | 423/213.5 |
| 3,378,334 | 4/1968 | Bloch | 423/213.5 |
| 3,409,390 | 11/1968 | Hoekstra | 423/213.5 |
| 3,873,469 | 3/1975 | Foster et al. | 502/242 |
| 3,931,050 | 1/1976 | Asano et al. | 502/334 X |
| 4,316,822 | 2/1982 | Fujitani et al. | 252/462 |

FOREIGN PATENT DOCUMENTS 2070958  9/1981  United Kingdom .

*Primary Examiner*—W. J. Shine
*Attorney, Agent, or Firm*—Thomas K. McBride; William H. Page, II

[57] ABSTRACT

A lead-resistant exhaust gas oxidation catalytic composite is disclosed. The composite comprises a support material comprising a refractory inorganic oxide having deposited thereon a catalytic component selected from the Group consisting of platinum, palladium, iridium, rhodium and mixtures thereof and having dispersed thereover a protective coating of zirconia. Also disclosed is a method for effecting oxidation of noxious exhaust gases comprising hydrocarbons, carbon monoxide and lead compounds. Additionally, a method for oxidizing an exhaust gas from an internal combustion engine operating upon leaded fuel is also disclosed.

5 Claims, No Drawings

LEAD-TOLERANT CATALYST SYSTEM FOR TREATING EXHAUST GAS CONTAINING LEAD COMPOUNDS

CROSS-REFERENCE TO RELATED APPLICATION

This application is a continuation-in-part of prior copending application Ser. No. 536,416, filed Sept. 27, 1983, and entitled Catalyst and Method For Treating Exhaust Gases, now abandoned.

BACKGROUND OF THE INVENTION

The present invention relates to a lead-tolerant catalyst system and method for oxidizing exhaust gas containing lead compounds prior to discharging the exhaust gas into the atmosphere. The catalyst system of the present invention exhibits enhanced stability as a result of resistance to lead poisoning when effecting the conversion of auto exhaust gases or other lead-containing exhaust gas streams of a noxious nature.

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. In recent years, with the ever growing number of automobiles powered by internal combustion engines, the discharge of pollutants therefrom has been of increasing concern, particularly in urban areas where the problem is more acute, and the control thereof has become exceedingly important. Of the various methods which have been proposed for converting carbon monoxide, hydrocarbon and nitrogen oxide pollutants to innocuous products, the incorporation of a catalyst converter in the exhaust system of an internal combustion engine holds the most promise of meeting the increasingly rigid standards established for automotive vehicles by the responsible governmental authorities.

In order to achieve the conversion of carbon monoxide in hydrocarbon pollutants, it has become the practice to employ catalysts in conjunction with air-to-fuel ratio control means which function in response to a feedback signal from an oxygen sensor in the engine exhaust system. The air-to-fuel ratio control means is typically programmed to provide fuel and air to the engine at a ratio conducive to a near stoichiometric balance of oxidants and reductants in the hot exhaust gases at engine cruising conditions, and to a stoichiometric excess of reductants at engine idling and acceleration conditions. The result is that the composition of the exhaust gases with which the catalyst is contacted fluctuates almost constantly, such that conditions to which the catalyst is exposed are alternatively netreducing and net-oxidizing. A catalyst for the oxidation of carbon monoxide and hydrocarbons must be capable of operating in such a dynamic environment.

Aside from problems of operating environment, exhaust gas oxidation catalysts are often subject to contamination by contact with poisoning constituents which act to decrease the catalyst's ability to convert noxious components. For example, it has become common practice to add to automotive gasolines certain anti-knock compounds. These compounds often act as catalyst poisons for automotive exhaust oxidation catalysts employed for the conversion of hydrocarbons, and CO in automotive exhaust gases. Typical of the anti-knock compounds which pose the greatest potential for poisoning exhaust catalysts are alkyl lead compounds. Lead compounds which are the combustion products of the alkyl lead anti-knock component exit the engine with the exhaust gas. When the lead containing exhaust gas is contacted with the exhaust gas catalyst, lead is deposited on the catalytically active sites of the catalyst thereby causing deactivation. After long exposure to exhaust gases containing lead compounds the exhaust gas catalyst becomes substantially inactive and incapable of performing its intended functions.

Two alternative solutions exist for coping with this poisoning of exhaust gas catalyst. The first alternative is to eliminate the poisons from the exhaust prior to contact with the catalyst. In the case of lead compounds in automobile exhaust gases this has been achieved by eliminating alkyl lead compounds as anti-knock components of gasoline. Unfortunately, the elimination of lead-based anti-knock compounds has resulted in an overall increase in the cost of gasoline. This is because the displacement of lead anti-knock compounds has been compensated for by the additional blending of high octane components into gasoline in order to meet octane requirements. Producing high octane components such as benzene, toluene, and xylenes requires expensive and elaborate refining techniques, typically catalytic reforming. All in all these added steps act to increase the cost of gasoline. A second and more desirable alternative to removing lead-based anti-knock compounds would be to develop a lead-tolerant exhaust gas oxidation catalyst. Such a catalyst should be able to maintain high exhaust gas oxidation activity despite long term exposure to exhaust gases containing lead compounds. Such a catalyst would allow continued use of lead-containing anti-knock compounds thereby reducing the cost of gasoline while assuring the continued viable oxidation of the noxious exhaust gas components.

OBJECTS AND EMBODIMENTS

Accordingly, it is an object of the present invention to provide a lead-resistant exhaust gas oxidation composite capable of maintaining catalytic activity for the combustion of noxious exhaust gas components despite exposure to lead-containing compounds. A corollary objective is to provide a method of effecting oxidation of noxious exhaust gases comprising hydrocarbons, carbon monoxide and lead compounds. Yet another objective of the invention is to provide a method for oxidizing carbon monoxide, and hydrocarbons contained in an exhaust gas from an internal combustion engine operating upon fuel containing at least 0.01 g per liter of lead.

Therefore, in a broad embodiment the present invention comprises a lead-resistant exhaust gas oxidation catalytic composite comprising a support material comprising a refractory inorganic oxide having deposited thereon a catalytic component selected from the group consisting of platinum, palladium, iridium, rhodium and mixtures thereof and having dispersed thereover a protective coating of zirconia.

In an alternative embodiment the present invention comprises a method for effecting oxidation of noxious exhaust gases comprising hydrocarbons, carbon monoxide and lead compounds, said method comprising contacting said gases at oxidation conditions with a catalytic composite comprising a support material comprising a refractory inorganic oxide having deposited thereon a catalytic component selected from the group consisting of platinum, palladium, iridium, rhodium and mixtures thereof and having dispersed thereover a protective coating of zirconia.

In yet another embodiment the present invention is a method for oxidizing carbon monoxide, and hydrocarbons contained in an exhaust gas from an internal combustion engine operating upon fuel containing at least 0.01 g per liter of lead which method comprises contacting the exhaust gas at oxidation conditions with a catalytic composite comprising a support material comprising a refractory inorganic oxide having deposited thereon a catalytic component selected from the group consisting of platinum, palladium, iridium, rhodium and mixtures thereof and having dispersed thereover a protective coating of zirconia.

These as well as other objects and embodiments will become more apparent upon review of the following more detailed description of the invention.

INFORMATION DISCLOSURE

U.S. Pat. No. 3,304,150 to W. A. Stover et al. discloses a catalytic system possessing improved life and stability in the presence of volatile lead compounds contained in exhaust gases. The subject catalytic system includes ferric oxide which ingredient lends resistance to the catalyst. The catalytic system also contains suitable active oxidation components such as cobalt, copper, manganese and palladium. The oxidation component and ferric oxide are impregnated upon a base or support such as alumina, silica-alumina, silica magnesia, zirconia, zirconia alumina, zirconia magnesia, and magnesia. The preferred base is a gamma-type alumina.

U.S. Pat. No. 3,378,334 to H. S. Bloch likewise discloses a catalyst suitable for use for the oxidation of exhaust gases containing vaporized or entrained lead or lead compounds resulting from the combustion of leaded gasolines. In particular, the subject catalyst comprises a high surface or refractory inorganic oxide base or support such as alumina, alumina-silica, alumina-zirconia, etc., upon which is deposited by precipitation or impregnation techniques, one or more catalytically active metals or metal oxides, in particular, metals of the platinum group family. The preferred refractory oxide contains a major proportion of alumina. An oxide such as silica, titania, zirconia, hafnia or a mixture of two or more of such oxides may be incorporated with the alumina in an amount within the range of about 0.1 to about 30 wt. %. Improved results as to lead poisoning resistance of the catalyst is attributed to maintaining a low average bulk density (ABD) of less than about 0.4 gm/cc of catalyst and more particularly, an ABD within the range of about 0.15 to about 0.35 gm/cc. Supposedly, such a structure is characterized by a high percentage of macropores which can adsorb substantial quantities of lead compounds without obstructing active catalytic sites. In any event the carrier material preferably comprises a major portion of alumina, and, for instance, from 0.5 to about 30 wt. % silica based on the carrier material or a major proportion of alumina plus about 0.1 to about 10 wt. % zirconia based on the carrier material. It is taught to be preferred that the zirconia be incorporated in an amount ranging from 0.5 to 5 wt. %.

U.S. Pat. No. 3,409,390 to J. Hoekstra discloses a catalytic composite having a longer life and enhanced stability as well as resistance to lead compound absorption and lead poisoning when effecting the conversion of auto exhaust gases or other lead-containing combustible waste gases. Specifically patentee maintains that an alkaline earth component particularly, barium, calcium, and strontium when incorporated into the catalytic composite is critically important in improving the stability or life of the catalyst as well as decreased lead pick-up when the catalyst is subjected to exhaust gas fumes from engines using leaded fuels. The catalytic composite disclosed in the present reference also contains a catalytically active metal component or components composited with a refractory oxide material possessing an ABD of less than 4 gm/cc. The catalytically active metal components composited with the refractory inorganic oxide may be one or more of the following; vanadium, chromium, molybdenum, tungsten, members of the iron group and platinum group of the periodic table, copper, silver and gold. Suitable inorganic oxides include silica, boria, thoria, titania, zirconia, hafnia and mixtures of two or more. The preferred inorganic oxide is alumina or if employed in conjunction with another inorganic oxide, such other inorganic oxide is present in an amount within the range of 0.5 to about 25% by weight.

U.K. Patent application No. 2 070 958 further discloses an exhaust gas catalyst resistant to lead compound poisoning. Specifically the catalyst comprises one or more platinum group metals and a base metal component deposited upon a substrate coated with refractory metal oxide. The preferred refractory metal oxide is alumina.

U.S. Pat. No. 4,316,822 to Fujitani et al. discloses a catalyst for reducing nitrogen oxides, carbon monoxide, and hydrocarbons in exhaust gases which catalyst comprises a porous carrier of ceramic material selected from the group consisting of alumina and aluminamagnesia spinel; and a catalyst ingredient supported thereon consisting essentially of zirconium oxide, cerium oxide and a metal selected from the group consisting of platinum, palladium and mixtures thereof. The zirconia and cerium oxide supported on the carrier are preferably present in amounts of 0.6 g to 100 g liter carrier, and 0.8 to 170 g per liter carrier, respectively.

Finally, U.S. Pat. No. 3,873,469 discloses a catalyst which employs a zirconia washcoat layer. In the paragraph bridging columns 7 and 8 of this reference there is disclosed the use of titania and zirconia as support coatings. Additionally beginning at line 20 of column 8 there is disclosed the fact that layered support coatings comprising a base layer of alumina and a covering layer of zirconia prepared by a process comprising impregnating a support structure with an alumina precursor and a zirconia precursor in separate steps increases the adherence of the layers. It is important to understand, however, that the reference contemplates the use of a zirconia layer as a catalyst support not as a protective layer over a refractory oxide supported noble metal catalyst.

In summary then, although the art has been cognizant of zirconia-containing catalysts for treating exhaust gases, no reference has disclosed a lead resistant exhaust gas oxidation catalyst comprising a support material having deposited thereon a catalytic component selected from the group consisting of platinum, palladium, iridium, rhodium and mixtures thereof and having dispersed thereover a protective coating of zirconia. Moreover, the art does not disclose the novel method of the present invention for oxidizing exhaust gases and in particular oxidizing exhaust gases from an internal combustion engine.

DETAILED DESCRIPTION OF THE INVENTION

As heretofore indicated the lead-tolerance exhaust gas oxidation catalyst system comprises a refractory inorganic oxide having deposited thereon a catalytic component selected from the group consisting of platinum, palladium, iridium, rhodium and mixtures thereof and having dispersed thereover a protective coating of zirconia. It is to be understood that the refractory inorganic oxide support may be used advantageously in accordance with this invention in any configuration, shape, or size which exposes a catalytically effective amount of the noble metal components disposed thereon to the gas to be treated. The choice of configuration, shape, and size of the support depends on the particular circumstances of use of the method of this invention. Generally, in operations in which the catalytic composite is disposed in a fixed bed in an immobile vessel, the refractory inorganic oxide support can be conveniently employed in particulate form, as pills, pellets, granules, rings, spheres, etc. Particulate form is especially desirable for large volumes of catalytic composite, and for use in circumstances in which periodic replacement of the catalytic composite may be desired. In circumstances in which less mass is desirable or in which movement or agitation of particles of refractory inorganic oxide may result in attrition, dusting, and resulting loss of disposed metals or undue increase in pressure drop across the particles, a monolithic structure is preferred. In automobile exhaust gas applications and in other applications where dimensional or structural stability is particularly desired, a monolithic refractory inorganic oxide structure is preferred. In preparing a monolithic structure of refractory inorganic oxide, it is usually most convenient to employ the support oxide disposed as a thin film or washcoat on an inert carrier material which provides the structural support for said oxide washcoat. The inert carrier material can be any refractory material. It is preferred that the carrier material be unreactive with the refractory inorganic oxide support and zirconia and with the gas to which it is exposed. Ceramic materials are a preferred class of carrier material. Examples of suitable ceramic materials include sillimanite, petalite, cordierite, mullite, zircon, zircon mullite, spodumene, alumina-titanate, etc. The carrier material can best be utilized in any rigid unitary configuration which provides a plurality of pores or channels therethrough extending in the direction of gas flow. It is preferred that the carrier material be a honeycomb configuration. The carrier material can be used advantageously in either unitary form, or as an arrangement of multiple modules. The carrier material can be oriented such that gas flow is generally in the same direction as the cells or channels of the carrier material, or the gas flow through the carrier material in a transverse or radial manner. For a more detailed discussion of monolithic structures, refer to U.S. Pat. No. 3,767,453. The carrier material may also be made of any metal (including alloys) such as those disclosed in U.K. Patent Application No. 2 013 517 which can be fabricated into the desired form (e.g. honeycomb), are oxidation resistant and are otherwise capable of withstanding high temperatures.

The surface area of the material comprising the monolithic structure is not critical to the method of this invention. It is preferred that the micropore volume of the material be relatively low, and it is especially preferred that the material have a macropore distribution such that at least about 90% of the pore volume is in pores having a diameter of greater than about 2000 Angstroms. The surface area of the monolithic structure, as opposed to the material of which the structure is made, should be maximized consistent with pressure drop limitations for the particular application of the catalytic system of this invention. It is preferred that the surface area of the monolithic structure be from about 50 to about 1000 square meters per liter of structure, as measured by $N_2$ adsorption, where the volume of the structure is measured by its exterior dimensions. The geometric surface area of the monolithic structure, in terms of cell density, should be maximized consistent with pressure drop limitations, and is preferably in the range from about 200 to about 800 cells per square inch of cross-sectional area of the structure.

As heretofore set forth the noble metal component is supported on a refractory inorganic oxide. Any suitable refractory inorganic oxide may be utilized and many are known in the art to have beneficial use in the oxidation of exhaust gases. These include titania, zirconia, alumina, silica, ceria, lanthana, or mixtures of these. Alumina is especially preferred. Because of this preference the following discussion of the invention will be made with specific reference to alumina; however, it is to be understood that other refractory inorganic oxides may be utilized in place of alumina. The description with reference to alumina is merely for convenience.

The alumina catalyst washcoat support can be deposited on the monolithic carrier by any conventional or convenient means. Typical of such means is by dipping the carrier in an alumina-containing slurry. It is preferred that the alumina washcoat deposit be in the form of a film of from about 0.0003 to about 0.01 inches thick. It is also preferred that the alumina be present on the monolithic support in amounts in the range from about 400 g per cubic foot of carrier to about 10,000 g per cubic foot of carrier, where the volume is measured by the exterior dimensions of the monolithic carrier structure.

Irrespective of the exact method of employing the alumina catalytic support material, the catalyst system of the present invention comprises a catalytic component selected from the group consisting of platinum, palladium, iridium, rhodium and mixtures thereof. Platinum is the preferred catalytic component. In addition to these metal components the catalyst system may have dispersed on the alumina catalytic support other metallic components which may act as stabilizers and/or interspersants which are well known in the art. Typical of such stabilizers and/or interspersants are the lanthanide series metal. Particularly well-known stabilizers of these series include lanthanum and/or cerium. Additionally, other components known to be beneficial in the oxidation of automotive exhaust gases may be present in the catalyst system of the instant invention.

Irrespective of the exact catalytic component or mixtures of components employed in the present invention and irrespective of any interspersants and/or stabilizers which may be employed in the catalyst system of the present invention, the noble metal component may be incorporated into the alumina catalytic support in any suitable manner. Such methods of an incorporation as coprecipitation, cogelation, ion exchange, or impregnation by soaking, dipping, immersion, or otherwise, may all be employed although not with equal results. The preferred method of incorporating the catalytic component into the alumina catalytic support involves the utilization of a soluble, decomposable compound of the particular metal component for impregnation of the alumina catalytic support in a relatively uniform manner. For example, a platinum component and/or a palladium component may be added to the alumina by commingling the latter with an aqueous solution of chloroplatinic and/or chloropalladic acid. The chloroplatinic acid and chloropalladic acid can be in common aqueous solution, or in separate aqueous solutions. In the latter case, in instances in which both a platinum and a palladium component are desired, the commingling of the alumina with the solutions can be performed sequentially in any order. Other water-soluble compounds or complexes may be employed in impregnation solutions and include ammonium chloroplatinate, bromoplatinic acid, platinum trichloride, platinum tetrachloride hydrate, platinum dichlorocarbonyl dichloride, dinitrodiamine platinum, sodium tetranitroplatinate, palladium chloride, palladium nitrate, palladium dioxide, diamminepalladium hydroxide, and tetramminepalladium chloride.

Utilization of a platinum or palladium chloride compound, such as chloroplatinic or chloropalladic acid or iridium trichloride hydrate, is ordinarily preferred. Hydrogen chloride, nitric acid, or the like acid can be added to the solution in order to further facilitate the uniform distribution of the metallic components throughout the alumina support material. In addition, it is generally preferred to dispose the catalytic component on the alumina support material after the support material has been calcined in order to minimize the risk of washing away the valuable metal compounds; however, in some cases it may be advantageous to dispose the catalytic component on the alumina when it is in a gelled state.

Likewise, when a rhodium component is incorporated with the alumina support, typically in connection with a process for purifying leaded fuel exhaust gas, the rhodium component may be added to the alumina support by commingling the latter with an aqueous solution of rhodium trichloride. Other water soluble compounds or complexes of rhodium may be employed, such as hexamminerhodium chloride, rhodium carbonylchloride, rhodium trichloride hydrate, rhodium nitrate, sodium hexachlororhodate, and sodium hexanitrorhodate.

Further, when an iridium component is incorporated into the catalyst, the iridium component may be added to the alumina support by commingling the latter with an aqueous or anhydrous alcoholic solution of iridium salts such as $H_2IrCl_6$, $H_3IrCl_6$, $HIrCl_2(OH)_2$, $(NH_4)_3IrCl_6$, $(NH_4)_2IrCl_5(H_2O)$, $[Ir(NH_3)_4Cl_2]Cl$, $[Ir(NH_3)_5(H_2O)]Cl_3$.

When the catalytic metal impregnated alumina catalytic composite is deposited upon a monolithic structure as heretofore described the catalytic component loading is such that it ranges from about 10 g per foot cubed of support matrix monolith to about 100 g per foot cubed of support matrix monolith. When the catalytic components are supported in another manner, such as upon pellets comprising alumina, the components are incorporated in amounts ranging from about 0.1 to 4 wt. % based on the weight of the alumina pellets.

The protective coating of zirconia can be deposited on the catalytic composite of the present invention by any suitable means. If the catalyst is in the form of pellets the zirconia may be impregnated into the pellets. If the catalyst is to be supported on a monolithic carrier structure the protective coating of zirconia may be applied as an overcoat over the alumina and catalytic components in the form of a thin film of from about 0.003 to about 0.01 inches thick. This overcoat may be applied to the monolithic structure by dipping the support structure containing the catalytic component on alumina in a zirconia-containing slurry. It is preferred that the zirconia be present on the monolithic support in amounts in the range of from about 400 g per cubic foot of carrier to about 10,000 g per cubic foot of carrier, where the volume is measured by the exterior dimensions of the monolithic carrier structure. It is further preferred that the weight ratio of zirconia to refractory oxide be less than about 1:1 based on the weight of the zirconia and refractory oxide.

As heretofore indicated, the catalytic composite comprising the catalytic component on alumina with a protective coating of zirconia superimposed thereover and, if desired, a monolithic support structure, may be used in a converter or a reactor of through-flow, cross-flow, or radial-flow, design installed in the exhaust line of an internal combustion engine. The converter or reactor may be employed in series with a subsequent oxidation converter or reactor with combustion air being injected ahead of the oxidation converter to ensure conversion of the residual carbon monoxide and hydrocarbons remaining in the exhaust gases.

Without wishing to be bound by the details of any specific theory regarding the mechanism of the invention, an attempt is made below to explain a possible mechanism of the invention. It is believed that the $SO_2$ in the exhaust gas undergoes further oxidation to $SO_3$ at the conditions within an exhaust gas oxidation zone in the presence of a noble platinum-, palladium-, iridium- or rhodium-containing catalyst. Thereafter, the $SO_3$ is reacted with lead to form $PbSO_4$. It is believed that the reaction of the lead with $SO_3$ takes place at the site of the metal catalytic component. Accordingly, it appears that the $PbSO_4$ has a less deleterious effect on the metal catalytic component oxidation function than does lead itself. Moreover, it is believed that $PbSO_4$ has an oxidation function in and of itself. Although this oxidation function is probably not as important as the oxidation function of the catalytic metal component, the presence of the $PbSO_4$ acts to minimize the adverse effect of lead contamination of the exhaust gas oxidation catalyst. In the prior art catalyst systems, for example, when alumina is present in the catalyst support $Al_2(SO_4)_3$ preferentially forms at the thermodynamic conditions within the exhaust gas oxidation zone. This has two adverse results. First, formation of $Al_2(SO_4)_3$ consumes $SO_2$ that might otherwise be available to form the more desirable $PbSO_4$. Secondly, formation of $Al_2(SO_4)_3$ results in a decrease in the catalyst support surface area and the commensurate loss of catalyst activity. In the present catalyst system, these problems are overcome by supporting the catalytic component on alumina and superimposing thereover a protective coating of zirconia. The formation of $Zr(SO_4)_2$ is not thermodynamically favored at the high temperature, typically 430° to about 600° C. which exists in the exhaust gas oxidation zone.

This results in the SO₂ being available to react with the lead components to form PbSO₄.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

This example is a comparison of the performance of the catalyst system of the present invention comprising a catalyst having a platinum component on alumina with a protective layer of zirconia thereover compared to a catalyst system of the prior art comprising platinum on alumina and a catalyst comprising platinum on alumina with a protective coat of alumina thereover. The comparison was made in connection with the use of leaded fuel.

The three catalysts were tested for oxidation activity in an engine dynamometer test. The oxidation activity test consisted of a measure of the sustained performance (the percent conversion of oxidizable compounds in the exhaust gas) at two different operating regimes. These operating regimes simulate an acceleration condition and a cruise condition for an internal combustion engine. Table I below sets out the test conditions for the dynamometer test described below.

TABLE I

| Test Conditions | Acceleration | Cruise |
|---|---|---|
| % CO | 2.0 | 0.2 |
| % O₂ | 4.8 | 5.3 |
| A/F Ratio | 17/1 | 19/1 |
| Inlet Temperature, °F. | 700 | 700 |
| Fuel Concentrations/liter | | |
| .15 grams Pb | | |
| 1 milligrams P | | |
| 200 ppm Sulfur-Tetrahydrothiophene | | |

Prior to carrying of the above-described oxidation test the catalytic composites were aged for 300 hours in an aging cycle designed to simulate vehicle aging of oxidation catalysts in a high lead content environment. The aging cycle consists of idle, cruise, and high cruise modes of operation. Table II below elucidates the conditions employed in the aging sequence.

TABLE II

| AGING CYCLE | | | |
|---|---|---|---|
| Inlet Temperature (°F.) | 850 ± 25 | 1400 ± 25 | 1100 ± 100 |
| Inlet CO (%) | 0.1–0.2 | 0.1–0.3 | 0.1–0.2 |
| Inlet O₂ (%) | 2 ± 0.5 | 1.5 ± 0.5 | 2.0 ± 0.5 |

Aging Fuel: Indolene Containing 570 mg Pb/gal., 4 mg P/gal., 250 wt. ppm S

To illustrate the favorble lead tolerant features of the catalyst of the present invention over the conventional alumina-containing catalyst, the following samples were prepared.

The conventional alumina supported catalyst was prepared by impregnating 300 g of gamma-alumina with 3.74 g of chloroplatinic acid solution (28.9 wt. % Pt) in excess water (1600 ml). The platinum-impregnated gamma-alumina was subsequently dried at about 100° C. in a rotary evaporator. After the drying steps, the platinum-impregnated gamma-alumina was calcined for 1 hour at 1000° F. in a direct fired furnace. The calcination step was followed by a reduction step at 500° C. in an H₂ atmosphere for 2 hours. The 300 g of platinum-impregnated alumina was slurried with 500 g of H₂O and 19 g of concentrated HNO₃ ball-milled for 2 hours. A 2.66 inch in diameter, 3 inch long 300 channel per square inch cordierite monolith was dipped into the above-described slurry followed by a blowout of the excess slurry. The monolith was subsequently calcined for 1 hour at 1000° F. The above dipping and calcining steps were repeated until the catalytic composite contained 10 g platinum per cubic foot which was equivalent to a total washcoat loading of 2782 g/ft³. This conventional alumina-washcoat catalyst was designated Catalyst "A."

Catalyst "B" was prepared exactly as Catalyst "A" except that the platinum loading was achieved by use of 3.02 g of chloroplatinic acid solution (28.89 wt. % Pt) per 150 g of alumina. The alumina loading of the washcoat was carried out such that the alumina content was about 0.6 times that of Catalyst "A," about 1900 g/ft³. In order to deposit the protective overcoat of alumina over the platinum on alumina washcoat, 300 g of gamma-alumina were slurried with 500 g of water, 19 g of concentrated HNO₃. This slurry was ball-milled for 2 hours. The above washcoated monolith was dipped into the slurry with the excess slurry blown out to provide the overcoat. The dipped monolith was thereafter calcined for 1 hour at 1000° F. The dipping and calcining steps were repeated until the total alumina loading, washcoat plus protective overcoat was the same as that of Catalyst "A's," about 2800 g/ft³. Catalyst "B" also contained 10 g platinum per cubic foot.

Catalyst "C" containing a protective zirconia overcoat on a platinum on alumina washcoat, was prepared by the following procedure. The same procedure as that employed in the preparation of Catalyst "B" wherein the alumina loading of the washcoat was about 0.6 times that of the pure alumina washcoat loading of Catalyst "A" was carried out. To provide the protective overcoat of zirconia, 300 g of zirconia were mixed with 200 g of water plus 8 g of concentrated HNO₃. This slurry was ball-milled for 6 hours. The above-described monolith was then dipped into the slurry with excess slurry subsequently blown out. The dipped monolith was thereafter calcined for 1 hour at 1000° F. The dipping and calcination steps were repeated until the total alumina plus zirconia and platinum loadings were the same as the alumina and platinum loadings of Catalyst "B."

The hydrocarbon and carbon monoxide oxidation conversions were measured after the above-described 300 hour aging cycle. The conversions were measured at acceleration and cruise conditions. "HC A" and "HC C" denote conversion of hydrocarbons at acceleration conditions and cruise conditions, respectively. "CO A" and "CO C" denote conversion of CO at acceleration and cruise conditions, respectively. Table III below sets out the results obtained.

TABLE III

| Catalyst | 100% Al₂O₃ Washcoat A | Al₂O₃ Overcoat B | ZrO₂ Overcoat C |
|---|---|---|---|
| HC A | 63 | 53 | 68 |
| CO A | 97 | 90 | 97 |
| HC C | 64 | 67 | 70 |
| CO C | 90 | 90 | 93 |

As can be seen from a review of the data in Table III with the exception of the conversion of CO under acceleration conditions, Catalyst "C" made in accordance with the present invention exhibited better conversion and, therefore, improved tolerance for lead poisoning over Catalysts "A" and "B." Moreover, with respect to the conversion of CO under acceleration conditions Catalyst "C" of the invention exhibited better conversion than Catalyst "B" and the same conversion as Catalyst "A." It can, therefore, be concluded that the invention surprisingly and unexpectedly leads to a catalyst of improved tolerance for poisoning by lead compounds.

I claim as my invention:

1. A lead resistant exhaust gas oxidation catalytic composite comprising a support material comprising a refractory inorganic oxide having deposited thereon a catalytic component selected from the group consisting of platinum, palladium, iridium, rhodium and mixtures thereof and having dispersed thereover a protective coating of zirconia.

2. The catalytic composite of claim 1 further characterized in that the refractory oxide support comprises alumina.

3. The catalytic composite of claim 1 further characterized in that the catalytic component comprises platinum.

4. The catalytic composite of claim 1 further characterized in that the weight ratio of zirconia to refractory oxide is less than about 1:1 based on the weight of zirconia and refractory oxide.

5. The catalytic composite of claim 1 further characterized in that the support material is deposited as a film on a honeycomb type ceramic or metallic carrier.

* * * * *